3,318,902
SUBSTITUTED PHENYLACETIC ACID ESTERS OF HYDROXYALKYL AZASPIRANES
Meier E. Freed, Philadelphia, Pa., and Leonard M. Rice, Minneapolis, Minn., assignors to American Home Products Corporation, New York, N.Y., a corporation of Delaware
No Drawing. Filed July 10, 1963, Ser. No. 294,186
7 Claims. (Cl. 260—294.3)

This invention relates to certain novel chemical compounds useful as central nervous system moderators. More particularly it is directed to a novel class of substituted phenylacetic acid esters of hydroxyalkyl azaspiranes which exert hypotensive or blood pressure reducing effects as well as central nervous system depressant activity in mammals.

The invention in its further aspects also involves methods for the manufacture and use of the aforesaid esters as well as certain intermediates obtained in the course of preparation of the ester and products.

The invention in its product aspect therefore chiefly concerns a series of new and novel substituted phenylacetic acid esters of hydroxyalkyl azaspiranes which may be generally represented by the following structural formula:

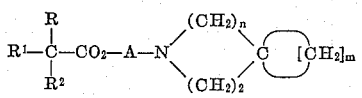

and the pharmaceutically acceptable acid addition salts thereof wherein R represents an aryl substituent, i.e., a phenyl radical or a phenyl radical substituted at any available position therein with lower alkyl, lower alkoxy or hydroxy group, each of which are considered equivalent; $R^1$ represents a phenyl radical, a lower cycloalkyl group having up to about 7 carbon atoms or a hydroxymethyl group; $R^2$ is a lower alkyl group, a hydroxy group or hydrogen and wherein $R^1$ and $R^2$ may be joined together to form a cycloalkyl ring. The moiety represented by A may be a di- or trimethylene unit which may or may not be substituted with a lower alkyl group; n is either 1 or 2 while m is a positive integer from 4 to 7.

In the above definition the terms "lower alkyl" and "lower alkoxy" are intended to refer to those substituents containing up to about 7 carbon atoms therein. This would of course include methyl, methoxy, ethyl, ethoxy, propyl, propoxy, etc., to name a few representative members of the group.

The compounds of our invention as illustrated above may be utilized in either the base form as shown above or the neutral acid addition salt form obtained by reaction of the base with a pharmaceutically acceptable non-toxic acid which may be either organic or inorganic. Some typical organic acids which may be used are acetic, maleic and citric, to mention a few of such for purposes of illustration, although any non-toxic acid may be employed. Suitable inorganic acids are typically hydrochloric, sulfuric, phosphoric, and the like acids. Also included within the scope of novel compounds which make up the product aspect of the invention are the quaternary salts of the aforesaid bases such as the methohalides and methosulfates obtained by treatment of the base with reagents such as methyliodide and methyl sulfate.

The preferred mode of manufacture of the novel compounds of our invention may be illustrated by the following reaction scheme for the preparation of the compound 2-(3-azaspiro[5.5]undec-3-yl)ethyl benzilate, to wit:

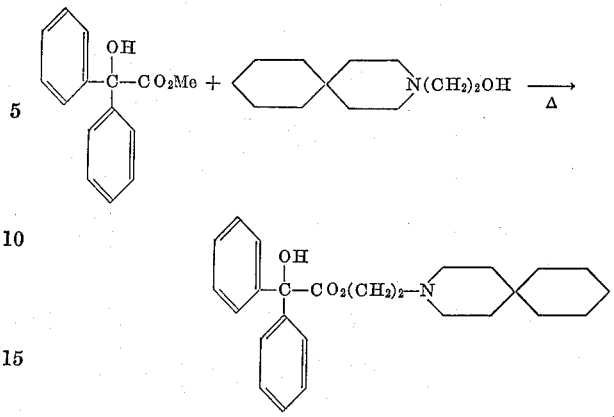

In the above typifying reaction which illustrates the preferred mode of preparation of our compounds, the final product is that species of general Formula I wherein R and $R^1$ represent a phenyl group, $R^2$ represents a hydroxy group. A represents a dimethylene moiety, n is 2 and m is 5. The reaction proceeds by reacting the compound methylbenzilate with a suitable hydroxyalkyl substituted azaspirane such as 3-(2-hydroxyethyl)-3-azaspiro[5.5]undecane and a sodium hydride dispersion accompanied by heating under a reflux in an organic reaction solvent such as anisole for about 4 hours. When the reaction has gone to completion the crude product obtained is purified by conventional techniques such as washing with saline, extracting with ether, and the like to obtain the purified product of the invention.

Although in the above reaction the solvent mentioned is anisole it is within the general scope of the preparative reaction that other organic reaction solvents such as acetone, benzene, hexane, methylene dichloride and the like be employed where desirable. Moreover other esters than the benzilate may of course be employed as a reactant such as the various diphenylacetates, other lower alkyl benzilates, and the like esters.

It can be seen by those skilled in the art that in the above method of preparation by the proper selection of a substituted methylbenzilate or diphenylacetate various final products can be obtained wherein one of the phenyl rings is substituted with various X substituents, to wit:

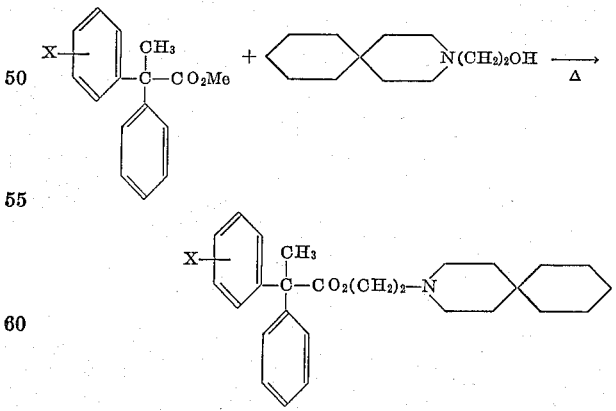

In the above reaction X represents such lower alkyl groups as methyl or ethyl; lower alkoxy groups as methoxy or ethoxy and hydroxy groups. The phenyl ring so substituted is represented generally by R in the generic formula set forth above, and in this typifying reaction $R^2$ represents a methyl group.

For therapeutic purposes the bases of general Formula I may be employed as such or in the form of their acid addition salts, it being understood that only those such salts should in practice be employed as contain anions that are relatively innocuous to the animal organism when used in therapeutic doses, so that the beneficial physiological properties inherent in the parent compound are not vitiated by side effects ascribable to those anions. These salts may be made from the bases of general Formula I by the methods heretofore used in the art for preparing acid addition salts. For example, the acid salts may be made by mixing the required base with an equivalent quantity of a non-toxic acid in a solvent and isolating the resultant salt by filtration after if necessary part or all of the solvent has been removed.

The compounds of the present invention can be prepared and administered to mammals, i.e., humans and animals, in a wide variety of oral and parenteral dosage forms, singly or in combination with other coacting compounds. They can if desired be associated with a carrier which can be a solid material or a liquid in which the compound is dissolved, dispersed, or suspended. The solid compositions can take the form of tablet, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as non-toxic alcohols, glycerine, or the like, may be thus used.

When so administered by oral or intraperitoneal routes in doses of from 5 to 200 mg./kg. of body weight to laboratory animals demonstrating nervous tremors, the compounds of the invention will moderate and alleviate these effects. Moreover, their utiilty, in addition to the specific areas noted, also extends to the general area of veterinary medicine as well as to experimental pharmacology where they are useful as agents in testing and evaluation of various central nervous system moderators.

The following examples will serve to further illustrate the invention in its various product and process aspects. Since the scope of the invention may only be determined by the definition of the invention expressed in the several appended claims, it must be understood that these several examples are purely exemplary of the invention and are not intended to limit it concept in any manner.

EXAMPLE 1

2-(3-azaspiro[5.5]undec-3-yl)ethyl benzilate

Heat a mixture of 5 g. of methylbenzilate (0.022 mole), 4 g. of 3-(2-hydroxyethyl)-3-azaspiro[5.5]undecane (0.02 mole) and 0.02 g. of 48% sodium hydride dispersion under reflux in 50 ml. of anisole for 4 hours. Cool the reaction and dilute with 50 ml. of benzene. Wash with saline, dry, and remove the solvent under vacuum. Redissolve the residue in acetone and treat the solution with dry hydrogen chloride. Add ether to precipitate the product. Filter off the precipitate, dry, and recrystallize from acetone and finally from water: M.P., 193–4°.

Analysis.—Calcd. for $C_{26}H_{34}ClNO_3$: N, 3.15; Cl, 7.98. Found: N, 3.42; Cl, 7.98.

EXAMPLE 2

3-(3-azaspiro[5.5]undec-3-yl)propyl benzilate

Reflux a mixture of 4.2 g. (0.02 mole) of 3-(3-hydroxypropyl)-3-azaspiro[5.5]undecane, 5 g. (0.022 mole) of methyl benzilate, and 0.3 g. of sodium hydride dispersion in 50 ml. of n-heptane with distillation of methanol. Filter the hot solution and allow to cool. Collect the crystallized base, wash with heptane, and dry. After recrystallization from heptane, dissolve the base in ethanol and treat with dry hydrogen chloride. Chill and filter off the precipitated product, wash with alcohol and with ether, and dry; M.P., 179–180°.

Analysis.—Calcd. for $C_{27}H_{36}ClNO_3$: N, 3.12; Cl, 7.74. Found: N, 3.20; Cl, 7.72.

EXAMPLE 3

2-(3-azaspiro[5.5]undec-3-yl)ethyl benzilate methiodide

Allow a mixture of 1 g. of 2-(3-azaspiro[5.5]undec-3-yl)ethyl benzilate and 1 ml. of methyl iodide to stand in 20 ml. of acetone. Filter off the crystals which separate, wash with acetone, and dry; M.P. 193–4°.

Analysis.—Calcd. for $C_{27}H_{36}INO_3$: C, 59.08; H, 6.60; N, 2.55; I, 23.12. Found: C, 58.84; H, 6.81; N, 2.61; I, 23.20.

EXAMPLE 4

2-(3-azaspiro[5.5]undec-3-yl)ethyl diphenylacetate

To a solution of 4 g. (0.02 mole) of 3-[2-hydroxyethyl]-3-azaspiro[5.5]undecane and 2 g. of triethylamine in 75 ml. of dry ether, add a solution of 4.6 g. of diphenylacetyl chloride in 50 ml. of ether. Stir for 2 hours and filter off the precipitate. Wash the filtrate with saline, dry, and concentrate the solution to a syrup. Take up in ethanol, treat with dry hydrogen chloride and add ether to cloudiness. Allow to stand in the cold, collect the product by filtration, wash, and dry; M.P. 149–150°.

Analysis.—Calcd. for $C_{26}H_{34}ClNO_2$: C, 72.90; H, 8.01; N, 3.27; Cl, 8.28. Found: C, 72.78; H, 7.85; N, 3.52; Cl, 8.40.

EXAMPLE 5

3-(3-azaspiro[5.5]undec-3-yl)propyl diphenylacetate

Prepare this compound in the manner of Example 4 from 4 g. (0.02 mole) of 3-[3-hydroxypropyl]-3-azaspiro[5.5]undecane, 2 g. of triethylamine, and diphenylacetyl chloride (4.6 g.). The hydrochloride salt melts at 162–163°.

Analysis.—Calcd. for $C_{27}H_{36}NO_2$: C, 73.35; H, 8.21; N, 3.17; Cl, 8.14. Found: C, 73.58; H, 8.44; N, 3.25; Cl, 8.12.

EXAMPLE 6

2-(3-azaspiro[5.5]undec-3-yl)ethyl 1-phenylcyclopentane carboxylate

In the manner of Example 4, prepare from 4 g. (0.02 mole) 3-(2-hydroxyethyl)-3-azaspiro[5.5]undecane, 2 g. of triethylamine, and 4.1 g. of 1-phenylcyclopentane carboxylic acid chloride the compound of this example. The hydrochloride (from acetone-ether) melts at 174–175°.

Analysis.—Calcd. for $C_{24}H_{26}ClNO_2$: C, 70.95; H, 8.94; N, 3.45; Cl, 8.73. Found: C, 70.73; H, 8.83; N, 3.70; Cl, 8.70.

EXAMPLE 7

3-(3-azaspiro[5.5]undec-3-yl)propyl 1-phenylcyclopentane carboxylate

In the manner of Example 4, prepared from 4.1 g. of 1-phenylcyclopentane carboxylic acid chloride, 2 g. triethylamine, and 4 g. of 3-(3-hydroxypropyl)-3-azaspiro[5.5]undecane, 3 - (3-azaspiro[5.5]undec - 3 - yl)propyl 1 - phenylcyclopentane carboxylate. The hydrochloride melts at 216–17°.

Analysis.—Calcd. for $C_{25}H_{38}ClNO_2$: C, 71.42; H, 9.12; N, 3.34; Cl, 8.39. Found: C, 71.97; H, 9.20; N, 3.54; Cl, 8.55.

EXAMPLE 8

2-(3-azaspiro[5.5]undec-3-yl)ethyl tropate

Reflux a solution of 3-(2-chloroethyl)-3-azaspiro[5.5]undecane (from 4.76 g., 0.02 mole of hydrochloride) and tropic acid (3.32 g., 0.02 mole) in isopropanol for 4½ hours. Cool the mixture, filter, and concentrate the filtrate to a small volume. Triturate with ether and crystallize the resulting solid from acetone-ether; M.P. 125° (hydrochloride).

Analysis.—Calcd. for $C_{21}H_{32}ClNO_3$: C, 66.05; H, 8.44; N, 3.67; Cl, 9.28. Found: C, 65.76; H, 8.59; N, 3.60; Cl, 9.36.

EXAMPLE 9

*2-(3-azaspiro[5.5]undec-3-yl)ethyl 2-phenyl-2-p-tolyl-propionate*

Reflux a solution of 3-(2-chloroethyl)-3-azaspiro[5.5]undecane (from 4.76 g., 0.02 mole of the hydrochloride) and 2-phenyl-2-p-tolylpropionic acid (4.8 g., 0.02 mole) in isopropanol (50 ml.) for 6 hours. Cool and filter the solution clear. The product may be obtained as the hydrochloride by addition of dry ether to the filtrate.

EXAMPLE 10

Follow the general procedure set forth in preceding Example 9 but substitute for the 3-(2-chloroethyl)-3-azaspiro[5.5]undecane reactant found therein the starting compounds (a) 8 - (2-chloroethyl)-8-azaspiro[4.5]decane and (b) 2-(2-chloroethyl)-2-azaspiro[4.7]dodecane to obtain the final products (c) 2-(8-azaspiro[4.5]dec-8-yl)ethyl 2-p-tolylpropionate and (d) 2-(2-azaspiro[4.7]dodec-2-yl)ethyl 2-p-tolylpropionate respectively, wherein $m$ in the general formula has the values 4 and 7 respectively.

EXAMPLE 11

*3-(3-hydroxypropyl)-3-azaspiro[5.5]undecane*

A. *3 - (3 - hydroxypropyl) - 3 - azaspiro[5.5]undecane-2,4-dione.*—Heat a mixture of 3-hydroxypropylamine (1 mole) and cyclohexane diacetic anhydride (1 mole) under reflux for 2 hours in 25 ml. of water. Evaporate the solution to a small volume and place in a distillation flask. Heat the mixture in an oil bath to 180–200° till evolution of water ceases. Distill the product at 159°–160° at 0.025 mm. of mercury.

*Analysis.*—Calcd. for $C_{13}H_{21}NO_3$: C, 65.24; H, 8.85; N, 6.02. Found: C, 65.16; H, 8.85; N, 5.85.

B. *3-(3-hydroxypropyl) - 3 - azaspiro[5.5]undecane.*—Add slowly a solution of 3-(3-hydroxypropyl)-3-azaspiro[5.5]undecane-2,4-dione (12 gm., 0.05 mole) in anhydrous ether to a stirring and refluxing suspension of lithium aluminum hydride (2.8 gms., 0.1 mole) in anhydrous ether (250 ml.). Reflux 12 hours, cool, decompose by the careful addition of water and filter. Concentrate the filtrate and distill the product, B.P. 92–96° at 0.075 mm.

*Analysis.*—Calcd. for $C_{13}H_{25}NO$: C, 73.88; H, 11.92; N, 6.63. Found: C, 73.65; H, 11.82; N, 6.74.

In a similar manner like hydroxyalkyl and haloalkyl substituted 3-azaspiro[5.5]undecanes may be prepared for use by selection of a suitably substituted amine in part A for reaction with the proper cycloalkyl diacetic anhydride to obtain the correct 2,4 dione which is transformed to the final product in the manner indicated. In such fashion a compound such as 3-(2-hydroxyethyl)-3-azaspiro[5.5]undecane, 3-[3-hydroxypropyl]-3-azaspiro[5.5]undecane, or 3-(2-chloroethyl)-3-azaspiro [5.5]undecane, or 3-[3-chloropropyl]-3-azaspiro[5.5]undecane may be obtained either initially or by simple halogenation in some cases involving the latter compounds. The analogous decane, dodecane etc. starting compounds may be prepared in like manner.

In addition to the hypotensive activity, central nervous system depressant activity and antitremorine activities noted previously for the compounds of our novel series it has been noted that various members also evidence antimetrazol, antimorphine and mild stimulant effects in test animals. They would therefore be expected to demonstrate use in such fields as tranquilizers and the like.

We claim.
1. 2-(3-azaspiro[5.5]undec-3-yl)ethyl benzilate.
2. 3-(3-azaspiro[5.5]undec-3-yl)propyl benzilate.
3. 2-(3-azaspiro[5.5]undec-3-yl)ethyl diphenylacetate.
4. 3-(3-azaspiro[5.5]undec-3-yl)propyl diphenylacetate.
5. 2 - (3-azaspiro[5.5]undec-3-yl)ethyl 1 - phenylcyclopentane carboxylate.
6. 3 - (3-azaspiro[5.5]undec-3-yl)propyl 1-phenylcyclopentane carboxylate.
7. 2-(3-azapiro[5.5]undec-3-yl)ethyl tropate.

References Cited by the Examiner

UNITED STATES PATENTS 2,856,406   10/1958   Biel _____ 260—294.3

OTHER REFERENCES

Royals et al.: J. Am. Chem. Soc., vol. 76, pages 5452–5 (1954).

ALEX MAZEL, *Primary Examiner.*

JOSE TOVAR, *Assistant Examiner.*